(12) United States Patent
Benouali (10) Patent No.: US 11,413,930 B2
(45) Date of Patent: Aug. 16, 2022

(54) HEAT TREATMENT SYSTEM FOR A VEHICLE

(71) Applicant: Valeo Systemes Thermiques, Le Mesnil Saint-Denis (FR)

(72) Inventor: Jugurtha Benouali, Le Mesnil Saint Denis (FR)

(*) Notice: Subject to any disclaimer, the term of this patent is extended or adjusted under 35 U.S.C. 154(b) by 0 days.

(21) Appl. No.: 17/251,999

(22) PCT Filed: Jun. 18, 2019

(86) PCT No.: PCT/FR2019/051482
§ 371 (c)(1),
(2) Date: Dec. 14, 2020

(87) PCT Pub. No.: WO2019/243727
PCT Pub. Date: Dec. 26, 2019

(65) Prior Publication Data
US 2021/0245573 A1    Aug. 12, 2021

(30) Foreign Application Priority Data
Jun. 18, 2018  (FR) ...................................... 1855306

(51) Int. Cl.
*B60H 1/00* (2006.01)
*F25B 41/20* (2021.01)
(Continued)

(52) U.S. Cl.
CPC ..... *B60H 1/00278* (2013.01); *B60H 1/00492* (2013.01); *B60H 1/3229* (2013.01);
(Continued)

(58) Field of Classification Search
CPC .............. B60H 1/32281; B60H 1/3229; B60H 1/00271; B60H 1/00278; B60H 1/00492;
(Continued)

(56) References Cited

U.S. PATENT DOCUMENTS 9,855,815 B2 * 1/2018 Saab ................... B60H 1/00385
10,611,210 B2 * 4/2020 Schedel ............. B60H 1/32281
(Continued)

FOREIGN PATENT DOCUMENTS

DE   102010051976 A1   6/2012
DE   102013206626 A1  10/2014
(Continued)

OTHER PUBLICATIONS

International Search Report and Written Opinion in corresponding International Application No. PCT/FR2019/051482, dated Oct. 14, 2019 (12 pages).
(Continued)

*Primary Examiner* — Miguel A Diaz
(74) *Attorney, Agent, or Firm* — Osha Bergman Watanabe & Burton LLP (57) ABSTRACT

The invention relates to a vehicle thermal management system (1) comprising at least a refrigerant circuit (2), a loop (3) for heat-transfer liquid, and a first heat exchanger (5) which thermally couples the loop (3) for heat-transfer liquid with the refrigerant circuit (2), the loop (3) for heat-transfer liquid comprising at least one heat exchanger (12, 35) configured to dissipate heat energy into a flow (18, 19) of air, the refrigerant circuit (2) comprising at least a compression device (4), the first heat exchanger (5), a refrigerant accumulation device (6), a first expansion device (16) and a second heat exchanger (17) designed to have passing through it a flow (18) of interior air sent into the interior of the vehicle, characterized in that the refrigerant circuit (2) comprises a leg (20) arranged in parallel with the first expansion device (16) and with the second heat exchanger (17), said leg (20) comprising a second expansion device (21) and a third heat exchanger (22) able to be thermally
(Continued)

coupled to at least a component of an electric powertrain of the vehicle.

10 Claims, 8 Drawing Sheets

(51) Int. Cl.
  *B60H 1/32*      (2006.01)
  *F25B 5/02*      (2006.01)
  *F25B 40/00*     (2006.01)
  *F25B 49/02*     (2006.01)
  *F25B 41/24*     (2021.01)

(52) U.S. Cl.
  CPC ............... *F25B 5/02* (2013.01); *F25B 40/00* (2013.01); *F25B 41/20* (2021.01); *F25B 41/24* (2021.01); *F25B 49/02* (2013.01); *B60H 2001/00307* (2013.01); *B60H 2001/00928* (2013.01); *B60H 2001/00949* (2013.01); *B60H 2001/00957* (2013.01); *F25B 2339/047* (2013.01); *F25B 2600/2519* (2013.01)

(58) Field of Classification Search
  CPC ........... B60H 1/00914; B60H 1/00921; B60H 2001/00307; B60H 2001/00928; B60H 2001/00949; B60H 2001/00957; F25B 5/02; F25B 40/00; F25B 40/02; F25B 41/20; F25B 41/40; F25B 43/006; F25B 49/02; F25B 2339/044; F25B 2339/047; F25B 2400/16; F25B 2600/2519
  See application file for complete search history.

(56) References Cited

U.S. PATENT DOCUMENTS

| | | | |
|---|---|---|---|
| 2014/0208775 A1* | 7/2014 | Styles | F25B 5/02 62/56 |
| 2015/0034272 A1* | 2/2015 | Saab | B60H 1/2215 165/43 |
| 2016/0116197 A1* | 4/2016 | Takeuchi | F25B 5/04 62/276 |
| 2017/0174038 A1* | 6/2017 | Scheldel | B60H 1/32284 |
| 2017/0182864 A1* | 6/2017 | Heyl | B60H 1/00907 |
| 2018/0134123 A1* | 5/2018 | Herbolzheimer | B60H 1/3216 |
| 2021/0116153 A1* | 4/2021 | Dong | F25B 13/00 |
| 2021/0268870 A1* | 9/2021 | Dong | F25B 41/325 |

FOREIGN PATENT DOCUMENTS

| | | | | |
|---|---|---|---|---|
| DE | 102015218825 A1 | | 3/2017 | |
| DE | 102016004999 B3 | * | 8/2017 | ......... B60H 1/32281 |
| FR | 2995669 A1 | * | 3/2014 | ......... B60H 1/00914 |
| FR | 3028016 A1 | * | 5/2016 | ............ F25B 25/005 |
| FR | 3055250 A1 | | 3/2018 | |
| WO | 2014/166713 A1 | | 10/2014 | |
| WO | 2018042091 A1 | | 3/2018 | |

OTHER PUBLICATIONS

Office Action issued in European Application No. 19746120.5, dated Jan. 31, 2022 (5 pages).

* cited by examiner

HEAT TREATMENT SYSTEM FOR A VEHICLE

The field of the present invention is that of heat treatment systems used for heating or cooling a space or a component of a vehicle, notably for a motor vehicle.

Motor vehicles are currently equipped with a refrigerant circuit used to heat or cool various zones or various components of the vehicle. It is particularly known, from document FR3055250A1, for this refrigerant circuit to be used to thermally treat an airflow sent into the cabin of the vehicle equipped with such a circuit.

In another application of this circuit, it is known for it to be used to cool an electrical storage device of the vehicle, said device being used to provide energy to an electric motor capable of moving the vehicle. The refrigerant circuit thus provides the energy capable of cooling the electrical-energy storage device when it is used during running phases.

Combining the function of cooling the vehicle cabin interior and the function of cooling the electrical storage device of the vehicle into the one same refrigerant circuit is a particularly complex matter. Such an architecture calls for numerous parts and is therefore complex. This architecture notably comprises numerous valves and overall exceeds in terms of capacity the essential functions that may be expected of it. This is a major disadvantage of the known systems.

Furthermore, the refrigerant circuits mentioned hereinabove use an accumulator positioned immediately upstream of the compression device. This component is particularly bulky, which makes it more complicated to install on the vehicle and is disadvantageous to the cost of the refrigerant circuit. Furthermore, the use of an accumulator prevents it from being possible to reach a compromise on performance between three modes of operation covered by the invention: a first mode of cooling the vehicle cabin interior, a second mode of cooling the component of the electric powertrain, and a third mode in which heat energy is recovered from at least one component of the electric powertrain. The use of an accumulator therefore forms a second disadvantage.

The invention falls within this context and proposes a technical solution which comprises a restricted number of parts and restrained routing of the circuit, and in which the bulkiness following installation in the vehicle and cost of manufacture are under control, while at the same time offering the option of performing at least three functions included among which are the function of cooling the vehicle cabin interior, the function of recovering energy from a component in the electric powertrain of the vehicle and the function of thermal management of a component of the electric powertrain of the vehicle.

The subject of the invention is therefore a vehicle thermal management system comprising at least a refrigerant circuit, a loop for heat-transfer liquid, and a first heat exchanger which thermally couples the loop for heat-transfer liquid with the refrigerant circuit, the loop for heat-transfer liquid comprising at least one heat exchanger configured to dissipate heat energy into a flow of air, the refrigerant circuit comprising at least a compression device, the first heat exchanger, a refrigerant accumulation device, a first expansion device and a second heat exchanger designed to have passing through it a flow of interior air sent into the interior of the vehicle cabin, which is innovative in that the refrigerant circuit comprises a leg arranged in parallel with the first expansion device and with the second heat exchanger, said leg comprising a second expansion device and a third heat exchanger able to be thermally coupled to a component of an electric powertrain of the vehicle.

According to one aspect, the refrigerant circuit comprises a first portion which comprises at least the compression device, the first heat exchanger, the refrigerant accumulation device, and a second portion which comprises the first expansion device and the second heat exchanger designed to have passing through it a flow of interior air sent into the interior of the vehicle cabin. The leg which comprises the second expansion device and a third heat exchanger is in parallel with the second portion, from the point of view of the refrigerant.

The third heat exchanger is notably thermally coupled to one of the components of the electric powertrain of the vehicle, for example to its electric motor that propels the vehicle, to its electrical-energy storage device or to its power electronics module which controls the electric motor mentioned here.

The refrigerant is, for example, a sub-critical fluid, as known under reference R134a or R1234yf. The refrigerant circuit according to the invention is a closed circuit which implements a thermodynamic cycle, particularly one involving compressing vapor.

The compression device is, for example, a compressor, and the invention is particularly applicable when the compressor is a fixed cylinder-capacity, variable-speed electric compressor. It is thus possible to control the thermal power of the refrigerant circuit.

The first heat exchanger forms a region for the exchange of heat between the refrigerant and the heat-transfer liquid. This is an exchanger which comprises a first compartment through which the refrigerant passes and a second compartment used by the heat-transfer liquid, the two compartments being organized in such a way that heat energy is transferred within them.

The accumulation device is advantageously a bottle, notably of desiccant. It may be incorporated into the first heat exchanger or positioned immediately downstream thereof, according to the direction of circulation of the refrigerant.

Advantageously, the elements of the refrigerant circuit may be positioned one after the other, and in a precise order. It is notably this arrangement which, depending on the envisioned mode of operation, makes it possible to achieve first-rate thermal performance, at low cost.

Advantageously, the refrigerant circuit comprises a point of divergence, at which the leg begins, and a point of convergence at which said leg ends, the refrigerant circuit comprising an internal heat exchanger which comprises a first pass and a second pass which are configured to have the refrigerant pass through them, the second pass of the internal heat exchanger being positioned between the point of convergence and an inlet of the compression device. The refrigerant circuit is thus equipped with an internal heat exchanger common to the refrigerant which circulates in the second portion and to the refrigerant which circulates in the leg.

Alternatively, the refrigerant circuit comprises a point of divergence at which the leg begins, and a point of convergence at which said leg ends, the refrigerant circuit comprising a first internal heat exchanger of which at least one pass is positioned between an outlet of the second heat exchanger and the point of convergence. In such cases, the first internal heat exchanger is active only with respect to the refrigerant which is sent toward the second heat exchanger.

As an alternative or in addition, the refrigerant circuit comprises a second internal heat exchanger of which at least one pass is positioned between an outlet of the third heat exchanger and the point of convergence. In such cases, the second internal heat exchanger is active only with respect to the refrigerant which is sent toward the third heat exchanger.

In one example, the first expansion device and/or the second expansion device is/are configured to cut off any circulation of refrigerant toward the second heat exchanger or toward the third heat exchanger, respectively.

It will be noted that the first expansion device and/or the second expansion device may be a thermostatic expansion valve.

Alternatively, the first expansion device and/or the second expansion device is an electronically controlled expansion valve.

In one embodiment example, the refrigerant circuit comprises a fourth heat exchanger designed to have passing through it a flow of air external to the interior of the vehicle cabin and positioned between an outlet of the accumulation device and the point of divergence.

The fourth heat exchanger may notably be used to supercool the refrigerant. The positioning of the fourth heat exchanger in the refrigerant circuit according to the invention notably makes it possible to minimize the number of valves and the amount of piping needed to incorporate a supercooling exchanger.

Advantageously, the fourth heat exchanger is upstream of the heat exchanger according to the direction of circulation of the flow of air passing through them.

According to one optional aspect of the invention, the refrigerant circuit comprises at least one check valve positioned between an outlet of the fourth heat exchanger and the point of divergence.

Advantageously, the refrigerant circuit comprises at least a first control valve controlling the circulation of refrigerant toward the fourth heat exchanger.

Still advantageously, the refrigerant circuit comprises at least one length of piping which joins an outlet of the accumulation device to the point of divergence, said piping being arranged in parallel with the first portion of the refrigerant circuit.

In this configuration, the refrigerant circuit may comprise a second control valve controlling the circulation of refrigerant in the piping.

As an alternative to the first valve and to the second valve, the refrigerant circuit comprises at least one three-way valve positioned at a point of separation at which the circuit separates.

According to one aspect of the invention, the heat exchanger of the loop for heat-transfer liquid is a radiator designed to have passing through it a flow of air external to the interior of the vehicle cabin.

Alternatively, the heat exchanger of the loop for heat-transfer liquid is a unit heater designed to have passing through it the flow of interior air sent into the interior of the vehicle cabin.

The invention of course covers a combination of these means, in which the loop for heat-transfer liquid comprises a first heat exchanger designed to have passing through it the flow of air external to the interior of the vehicle cabin, as well as the second heat exchanger designed to have passing through it the flow of interior air sent into the interior of the vehicle cabin. In such an instance, the first heat exchanger is a radiator, whereas the second heat exchanger is a unit heater.

Further features, details and advantages of the invention will become more clearly apparent from reading the following description, which is provided by way of illustration and with reference to drawings in which.

It should first of all be noted that the figures explain the invention in detail for implementing the invention, it being, of course, possible for said figures to serve to better define the invention if necessary. These figures are schematic representations which illustrate the way in which the thermal management system is produced, its composition, and how the fluids circulate within it. In particular, the thermal management system comprises, on the one hand, a refrigerant circuit and a loop for heat-transfer liquid, a heat exchanger having these two fluids passing through it.

The refrigerant circuit chiefly comprises a device for compressing the refrigerant, heat exchangers, expansion devices, piping connecting each of these components, and valves or shutters. The circuit may also be placed under the dependency of a controller which acts on certain of its components.

The terms upstream and downstream used in the following description refer to the direction of circulation of the fluid in question, that is to say the refrigerant, the heat-transfer liquid, an interior air flow sent to an interior of the vehicle cabin or a flow of air external to this interior of the vehicle cabin.

In FIGS. 7 to 10, the refrigerant is symbolized by an arrow which illustrates the direction of circulation of the latter in the piping in question. The solid lines illustrate a portion of the circuit where the refrigerant circulates, whereas the dashed lines show an absence of circulation of the refrigerant. The thick lines illustrate the refrigerant in a state of high pressure and high temperature, whereas the thinner lines illustrate this refrigerant in a state of low pressure and low temperature.

Figure 1:
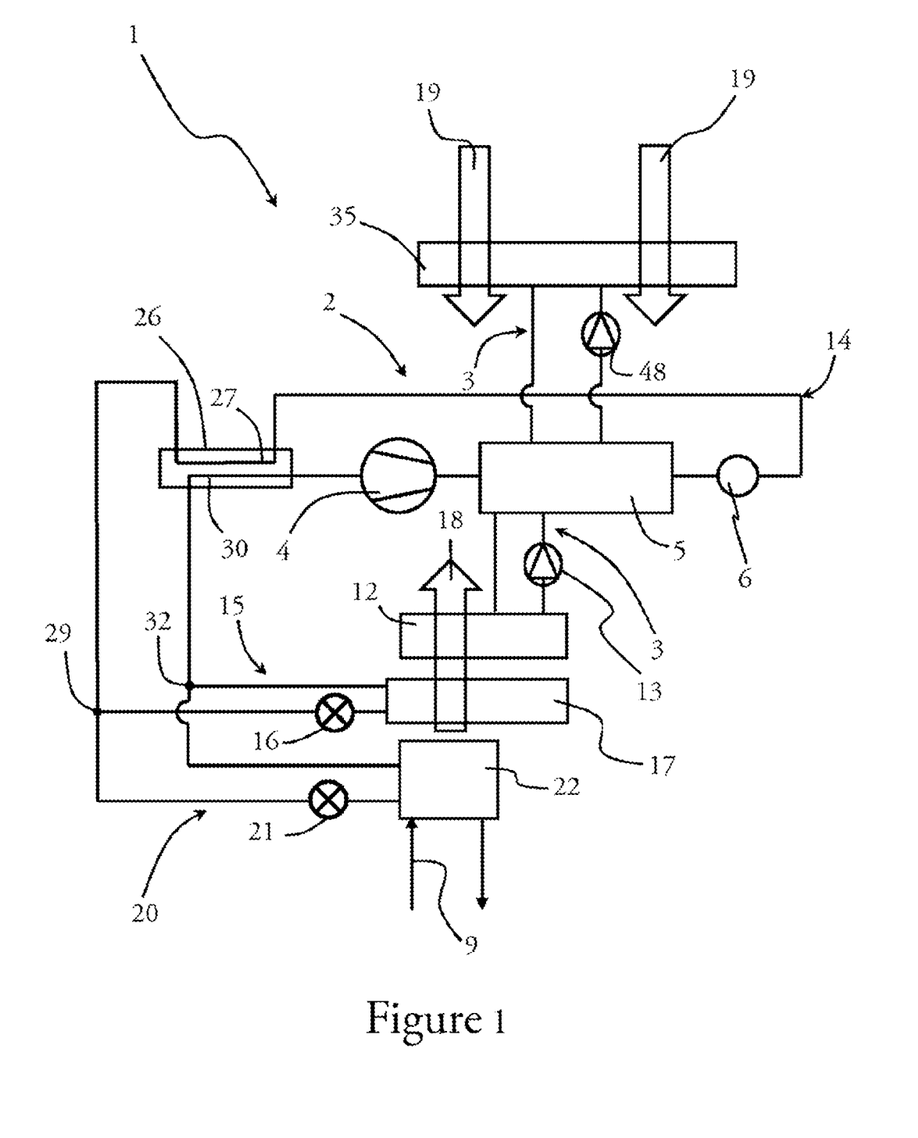
FIG. 1 is a schematic view of a thermal management system according to the invention, in a first embodiment.

FIG. 1 thus shows a thermal management system 1 which comprises a refrigerant circuit 2 inside which a refrigerant circulates, as well as a loop 3 for heat-transfer liquid, in which loop a heat-transfer liquid moves.

This refrigerant circuit 2 is a closed loop in which the refrigerant is made to circulate by a compression device 4. It will be noted that this compression device 4 can take the form of an electric compressor, that is to say a compressor which comprises a compression mechanism, an electric motor and possibly a controller. The rotation mechanism is rotated by the electric motor, the speed of rotation of which is controlled by the controller, which can be external or internal to the compression device.

According to the first embodiment depicted in FIG. 1, the refrigerant circuit 2 comprises, in this order and according to the direction in which the refrigerant circulates within it, at least the compression device 4 connected by piping to a first heat exchanger 5 which thermally couples the loop 3 for heat-transfer liquid to the refrigerant circuit 2. This first heat exchanger 5 is connected by piping to a refrigerant accumulation device 6. In this example, this accumulation device 6 is thus positioned, for example, immediately downstream of the first heat exchanger 5 and may for example adopt the form of a bottle of desiccant. It will be seen from the description of FIG. 5 that the positioning of this accumulation device 6 may change, without departing from the scope of the invention.

The above-listed elements of the refrigerant circuit 2 form part of a first portion 14 of the refrigerant circuit 2. This first portion 14 begins at a point of divergence 29 and ends at the point of convergence 32 of the refrigerant circuit 2.

This refrigerant circuit 2 also comprises a second portion 15 which extends from the point of divergence 29 to the point of convergence 32, closing the circuit with respect to the first portion 14. This second portion 15 comprises at least a first expansion device 16 and a second heat exchanger 17 designed to have passing through it a flow 18 of interior air sent into the interior of the vehicle cabin. This second portion 15 may also comprise an internal heat exchanger.

The accumulation device 6 is then connected directly to an internal heat exchanger 26, particularly to a first pass 27 of this internal heat exchanger 26. This first pass 27 of the internal heat exchanger 26 is connected directly to the point of divergence 29, namely to a point at which the refrigerant can divide into two parts.

The refrigerant circuit 2 also comprises the first expansion device 16 which is interposed between the point of divergence 29 and the second heat exchanger 17 designed to have passing through it a flow 18 of interior air sent into the interior of the vehicle cabin.

According to this embodiment example, the first expansion device 16 is an electronically controlled expansion valve which comprises at least a total shutoff function, which prevents the circulation of the refrigerant through it. Thus, the first expansion device 16 according to the invention is configured to adopt at least a position in which it blocks any circulation of refrigerant toward the second heat exchanger 17 and positions in which it generates a drop in pressure head in the refrigerant, notably with a view to causing it to expand. It will be noted that this second heat exchanger 17 is used as an evaporator to cool the flow of interior air 18 which is sent into the interior of the vehicle cabin.

One outlet of the second heat exchanger 17 is connected to the point of convergence 32, namely to a point through which two flows of refrigerant meet to combine into a single flow which heads toward the internal heat exchanger 26. The latter thus comprises a second pass 30 which is connected on one side to the point of convergence 32 and on the other two an inlet of the compression device 4, where the thermodynamic cycle can begin anew. The refrigerant which circulates in the first pass 27 of the internal heat exchanger 26 thus exchanges heat energy with the refrigerant circulating in the second pass 30 of this same internal heat exchanger.

According to the invention, the refrigerant circuit 2 comprises a circuit leg 20 which is installed in parallel with the second portion 15. This leg 20 is thus connected to the point of divergence 29 and to the point of convergence 32.

It will be appreciated that the internal heat exchanger 26 is common to the second portion 15 of the refrigerant circuit 2, which comprises the first expansion device 16 and the second heat exchanger 17, and to the leg 20 of the circuit which comprises the second expansion device 21 and the third heat exchanger 22. This internal heat exchanger 26 is common insofar as the refrigerant that passes through the first pass 27 of the secondary internal heat exchanger 26 divides into two flows which each supply the second portion 15 and the leg 20, this separation occurring after the first pass 27, at the second point of divergence 29.

The refrigerant circuit leg 20 comprises a second expansion device 21 and a third heat exchanger 22 which is designed to cool an additional fluid 9. The second expansion device 21 is notably an electronically controlled expansion valve which comprises at least a total shutoff function, which prevents the circulation of the refrigerant through it. Thus, the second expansion device 21 according to the invention is configured to adopt at least a position in which it blocks any circulation of refrigerant toward the third heat exchanger 22 and positions in which it generates a drop in pressure head, notably for the purposes of causing the refrigerant to expand, in the refrigerant heading toward this third heat exchanger 22. It will be noted that this third heat exchanger 22 is used as an evaporator to cool the additional fluid which is thermally coupled to at least one component of an electric powertrain of the vehicle, it being possible for example for such a component to be an electric motor providing the propulsion of the vehicle, an electrical-energy storage device, or else an electronic control module controlling the electric motor. The third heat exchanger 22 is a heat exchanger exchanging heat between the refrigerant and the additional fluid 9, notably a glycol-water, and makes it possible either to cool the component of the powertrain, or to collect heat energy from this electric powertrain to put to beneficial use in the thermodynamic cycle which takes place in the refrigerant circuit 2.

The loop 3 for heat-transfer liquid comprises, for its part, at least the first heat exchanger 5 which is connected by piping to at least one heat exchanger 12 configured to dissipate heat energy into a flow of air. The loop 3 for heat-transfer liquid also comprises at least a pump 13 which displaces the heat-transfer liquid in such a way that the latter circulates through the first heat exchanger 5 and through the heat exchanger 12.

The first heat exchanger 5 is a heat exchanger, exchanging heat between the refrigerant and the heat-transfer liquid, in which a transfer of heat energy can be performed between one of these fluids and the other.

In this example, the loop 3 for heat-transfer liquid here comprises two heat exchangers configured to dissipate heat energy into a flow of air, each of these heat exchangers being arranged in loop portions that are distinct and that run in parallel with one another, notably a first portion and a second portion of the loop for heat-transfer liquid. A first heat exchanger 12 thus has passing through it the heat-transfer liquid and the flow 18 of interior air sent into the vehicle cabin interior. This first heat exchanger 12 is a unit heater tasked with heating the vehicle cabin interior, in cold conditions.

The loop 3 for heat-transfer liquid comprises a loop portion in which there is a second heat exchanger 35, the latter being configured to dissipate heat energy into the flow 19 of air external to the vehicle cabin interior. In other words, this second heat exchanger 35 is placed on the front face of the vehicle. The function of this second heat exchanger 35 is to discharge into the flow 19 of exterior air the heat energy derived from the first heat exchanger 5 and transported by the heat-transfer liquid. In this regard, the second heat exchanger 35 is a radiator.

The portion of the loop 3 for heat-transfer liquid that comprises the second heat exchanger 35 also comprises a circulating means 48 for circulating the heat-transfer liquid in this portion so that the heat-transfer liquid carries the heat energy picked up in the first heat exchanger 5 as far as the second heat exchanger 35 in order to discharge it into the flow 19 of exterior air.

Figure 2:
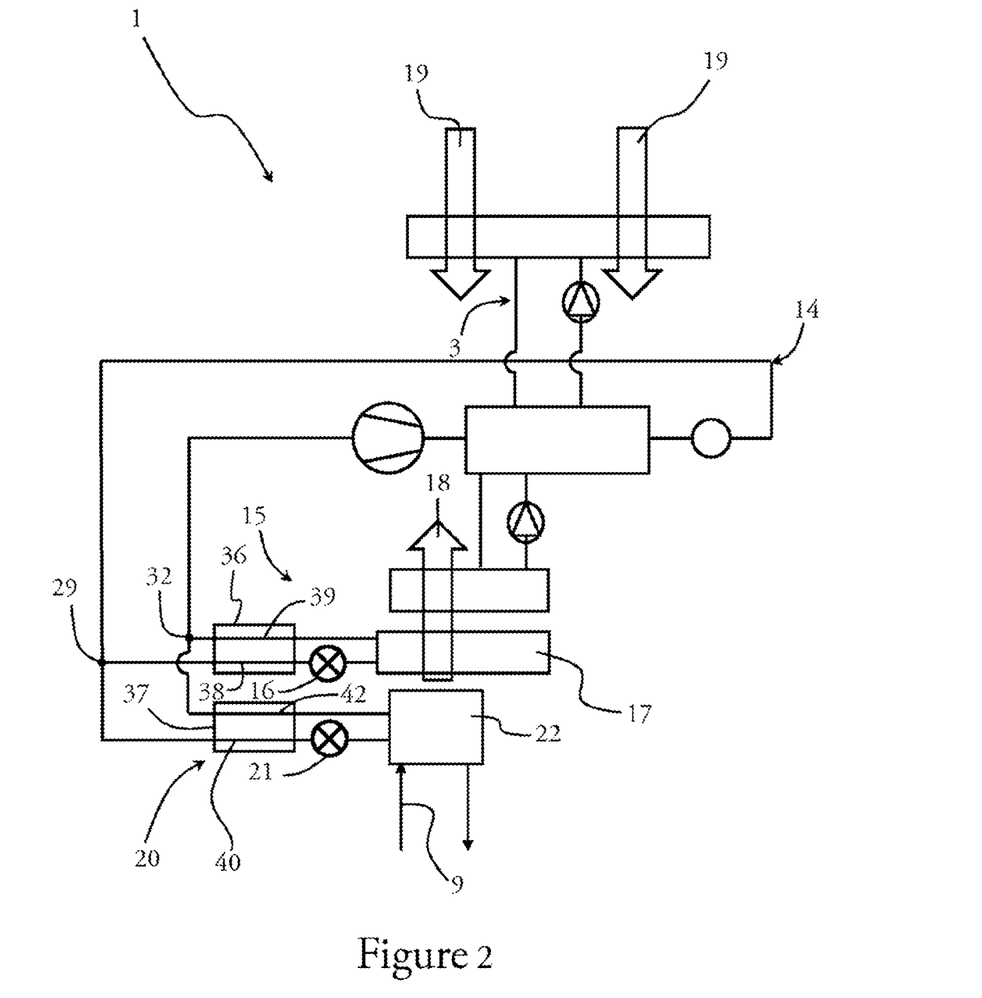
FIG. 2 is a schematic view of the thermal management system, in a second embodiment.

FIG. 2 shows a second embodiment of the thermal management system 1 that forms the subject matter of the invention. The refrigerant circuit 2 is identical to that described in FIG. 1, with the exception of the elements detailed hereinbelow, and reference may be made to the description of this FIG. 1 which applies mutatis mutandis to FIG. 2.

The common internal heat exchanger is here replaced in this second embodiment by individual internal heat exchangers, of which a first is installed in the second portion 15 of the circuit, whereas a second is positioned in the leg 20 which is parallel to the second portion 15 of the refrigerant circuit 2. The second portion 15 thus comprises a first internal heat exchanger 36, whereas the leg 20 comprises a second internal heat exchanger 37 which is separate and distinct from the first internal heat exchanger 36.

The first internal heat exchanger 36 thus comprises a first pass 38 arranged in the path connecting the point of divergence 29 to an inlet of the first expansion device 16. The first internal heat exchanger 36 also comprises a second pass 39 arranged between an outlet of the third heat exchanger 17 and the point of convergence 32. It will therefore be appreciated that the exchange of heat that occurs in the first internal heat exchanger 36 is dedicated to the refrigerant supplying and coming from the second heat exchanger 17.

The leg 20 of the circuit comprises the second internal heat exchanger 37, and the latter comprises a first pass 40 arranged in the path connecting the point of divergence 29 to an inlet of the second expansion device 21. The second internal heat exchanger 37 also comprises a second pass 42 arranged between an outlet of the third heat exchanger 22 and the point of convergence 32. It will therefore be appreciated that the exchange of heat that occurs in the second internal heat exchanger 37 is dedicated to the refrigerant supplying and coming from the third heat exchanger 22.

Figure 3:
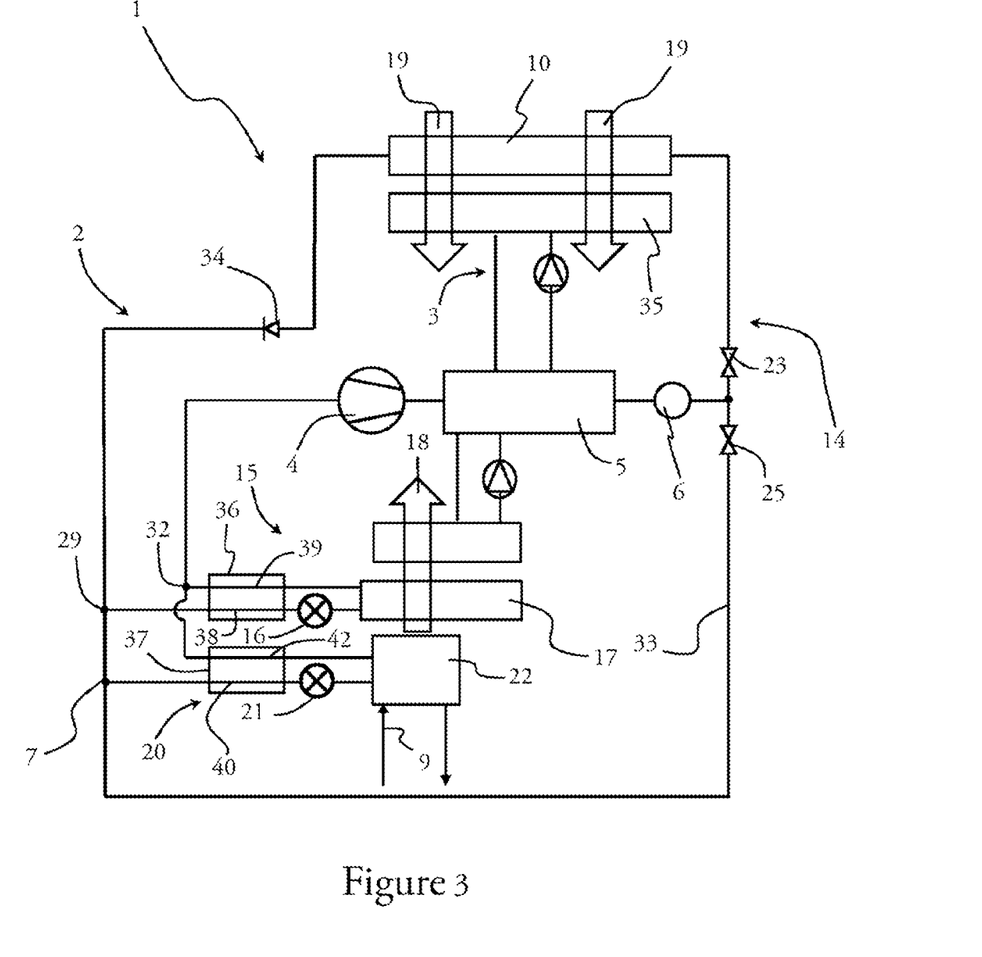
FIG. 3 is a schematic view of the thermal management system, in a third embodiment.

FIG. 3 shows a third embodiment of the management system 1 that forms the subject matter of the invention. This third embodiment is, to a large extent, identical to that described with reference to FIG. 2, the description of which applies, mutatis mutandis, the differences between the embodiment of FIG. 3 and that of FIG. 2 being explained hereinabove below.

Whereas in FIG. 1 or 2, an outlet of the accumulation device 6 is connected via a pipe to the point of divergence 29, FIG. 3 shows a refrigerant circuit 2 which comprises a fourth heat exchanger 10 designed to have passing through it the flow 19 of air exterior to the interior of the vehicle cabin. This fourth heat exchanger 10 is positioned on the refrigerant circuit 2 between an outlet of the accumulation device 6 and the point of divergence 29. It will be appreciated here that the fourth heat exchanger 10 is downstream of the first heat exchanger 5, according to the direction of circulation of the refrigerant.

The fourth heat exchanger 10 may notably be used to supercool the refrigerant. The positioning of the fourth heat exchanger 10 in the refrigerant circuit 2 according to the invention notably makes it possible to minimize the number of valves and the amount of piping needed to incorporate a supercooling exchanger.

In practice, such a fourth heat exchanger 10 is positioned for example on the front face of the vehicle, so as to be exposed to the flow 19 of exterior air generated by the movement of the vehicle. Such an arrangement within the vehicle notably makes it possible to optimize the size of the fourth heat exchanger 10, particularly in order to make use of the total available surface area on the front face.

The refrigerant circuit 2 further comprises a first control valve 23 which controls the circulation of refrigerant in the fourth heat exchanger 10. A check valve 34 also controls the circulation of the refrigerant and is positioned between an outlet of the fourth heat exchanger 10 and the point of divergence 29. This check valve 34 allows the refrigerant to circulate from the accumulation device 6 toward the point of divergence 29, and prevents any circulation of refrigerant in the opposite direction, namely from this point of divergence 29 toward the accumulation device 6.

The first main valve 23 is configured to shut off a circulation of refrigerant in the fourth heat exchanger 10 and is, for example, located between the accumulation device 6 and an inlet of the fourth heat exchanger 10.

From the point of view of the flow 19 of exterior air, the fourth heat exchanger 10 is upstream of the first heat exchanger 35.

FIG. 3 also shows piping 33 which connects an outlet of the accumulation device 6 to a connection point 7, the latter being located between the point of divergence 29 and an inlet of the first pass 40 of the second internal heat exchanger 37. The refrigerant circuit 2 comprises a second valve 25 configured to shut off a circulation of refrigerant in this piping 33.

Figure 4:
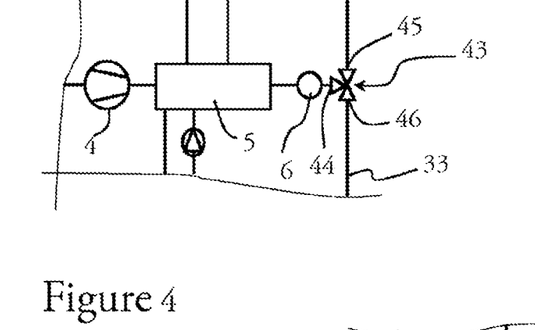
FIGS. 4 to 6 illustrate embodiment variants that may be applied to the thermal management systems of FIG. 1, 2 or 3, FIGS. 7 to 10 show the thermal management system that forms the subject matter of FIG. 3, operated according to various modes of operation.

FIG. 4 illustrates an embodiment variant that can be transcribed to the third embodiment described hereinabove. The compression device 4 discharges the hot refrigerant into the first heat exchanger 5.

When this refrigerant has had its heat energy removed, it enters the accumulation device 6 carefully sited between an outlet of the first heat exchanger 5 and an inlet of the fourth heat exchanger.

The first valve and the second valve are replaced here by a three-way valve 43 of which a first port 44 is connected to an outlet of the accumulation device 6, a second port 45 is connected to the inlet of the fourth heat exchanger 10 and a third port 46 is connected to the piping 33.

Figures 5, 6:
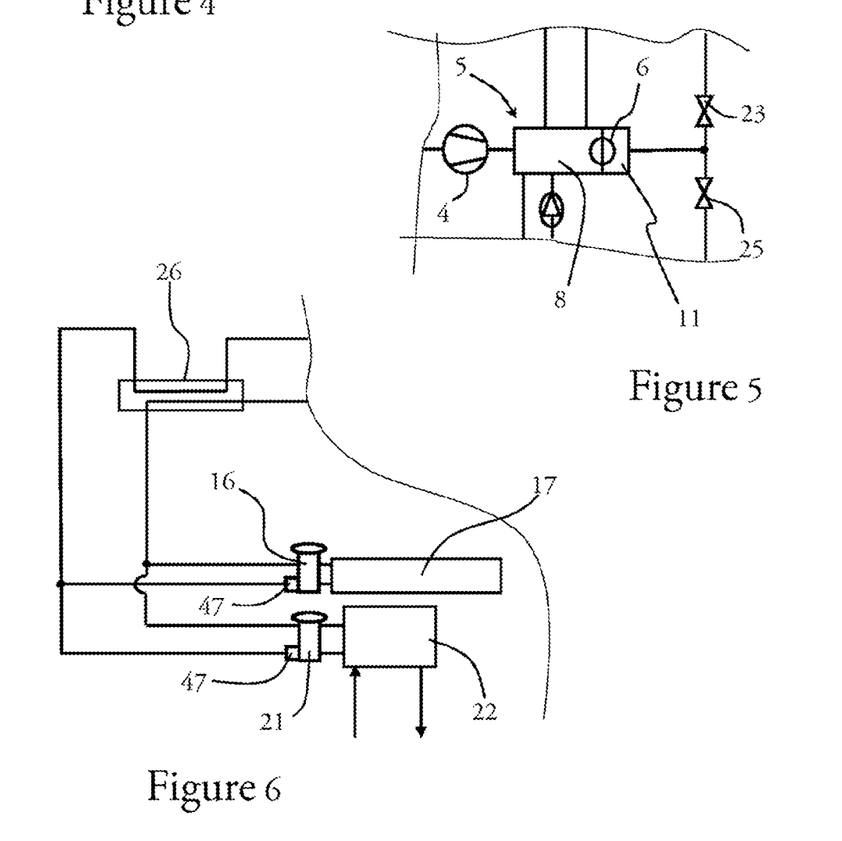

FIG. 5 shows an embodiment alternative that can be applied to any one of the embodiments of FIGS. 1 and 2. In this alternative, the accumulation device 6 is incorporated into the first heat exchanger 5.

This first heat exchanger 5 thus comprises at least a first zone 8 dedicated to a phase of condensing the refrigerant and a second zone 11 dedicated to a phase of supercooling the refrigerant. The accumulation device 6 is incorporated into the first heat exchanger 5, being situated at the boundary between these two zones 8, 11. In the case of a bottle of desiccant, this receives the refrigerant leaving the first zone 8, accumulates it, and delivers it in the liquid state to the second zone 11 of the first heat exchanger 5.

FIG. 6 illustrates another embodiment variant that can be applied to either one of the first, second or third embodiments illustrated in FIGS. 1, 2 and 3, respectively. In this particular instance, it is the common internal heat exchanger 26 that is illustrated in FIG. 6, but it will be appreciated that the modifications set out herein below can be reapplied to the embodiment using the first internal heat exchanger and the second internal heat exchanger assigned to the second portion 15 of the circuit, and to the leg 20 thereof, respectively.

In this variant, the first expansion device 16 and the second expansion device 21 are controlled-closure thermostatic expansion valves. In practice, these are thermostatic expansion valves of which an input section is dependent on a temperature and/or on a pressure of this refrigerant at the outlet of the heat exchanger concerned. The controllable closure of this thermostatic expansion valve is performed by a shut-off valve 47 built into the thermostatic expansion valve and which is configured to adopt at least a position that prevents any circulation of refrigerant through the controlled-closure thermostatic expansion valve, notably toward the inlet of the second heat exchanger 17 or toward the inlet of the third heat exchanger 22.

Figure 7:
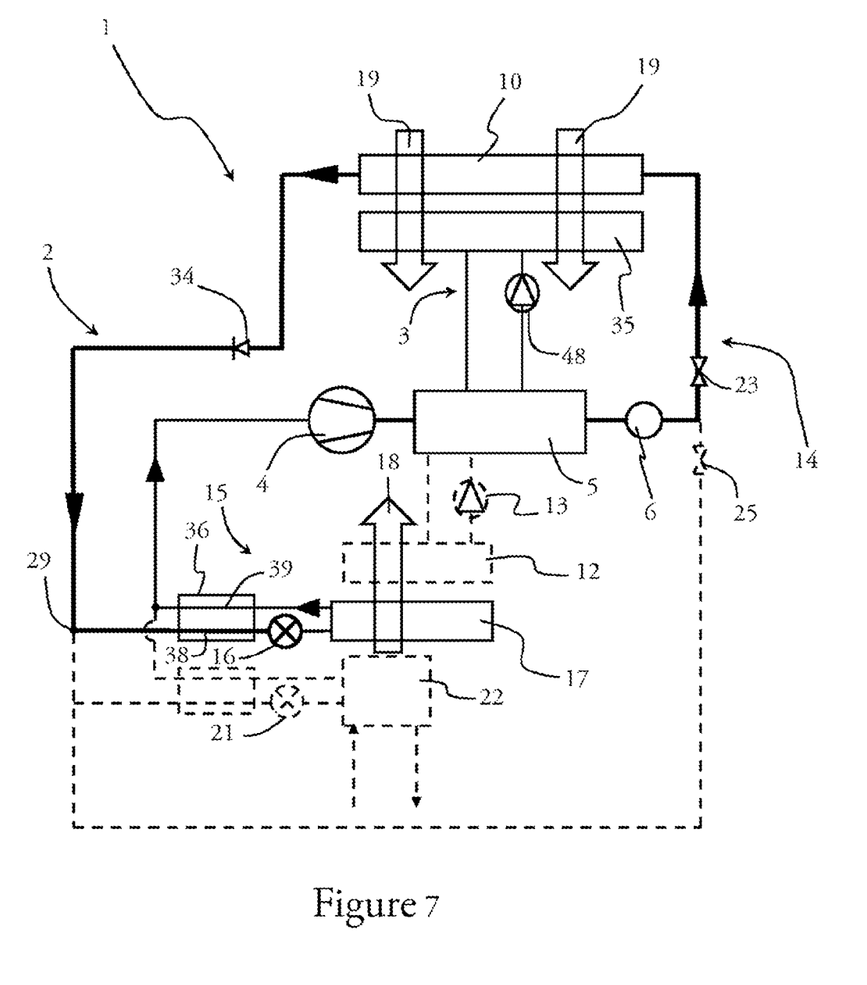

FIG. 7 considers by way of example the third embodiment shown in FIG. 3. This figure illustrates a mode of operation corresponding to a cooling of the flow 18 of air sent into the vehicle cabin interior.

The compression device 4 raises the pressure and the temperature of the refrigerant. This hot refrigerant is cooled as it passes through the first heat exchanger 5. As it does so, the refrigerant condenses and leaves the first heat exchanger 5 in the liquid state, said exchanger then being used as a condenser. The refrigerant in the liquid state is stored in the accumulation device 6, and only its liquid fraction leaves this accumulation device 6 to head toward the fourth heat exchanger 10. This is made possible because the first valve 23 is in the open position whereas the second valve 25 is in the closed position.

The refrigerant circulates through the fourth heat exchanger 10 in the liquid state and experiences forced supercooling, namely a lowering of its temperature to below its condensation temperature. This forced supercooling is performed by virtue of the flow 19 of exterior air which passes through the fourth heat exchanger 10. On leaving this fourth heat exchanger 10, the refrigerant passes through the check valve 34 and reaches the point of divergence 29.

The refrigerant in the liquid state enters the first internal heat exchanger 36, passing through the first pass 38. The refrigerant then reaches the first expansion device 16, inside which it experiences an expansion. The refrigerant then vaporizes as it passes through the second heat exchanger 17, the latter having passing through it the flow 18 of interior air sent into the vehicle cabin interior. This is how the cooling of the vehicle cabin interior is brought about.

The refrigerant in the gaseous state then leaves the second heat exchanger 17 and passes through the second pass 39 of the first internal heat exchanger 36. There is a transfer of heat energy between the refrigerant in the liquid state which is present in the first pass 38 and the refrigerant in the gaseous state which is present in the second pass 39 of the first internal heat exchanger 36. The refrigerant which leaves the second pass 39 of the first internal heat exchanger 36 finally arrives at an inlet of the compression device 4 so that a new thermodynamic cycle can take place within the refrigerant circuit 2.

On the side of the leg 20 of the circuit, the second expansion device 21 is in the closed position, which means that the third heat exchanger 22 is inoperative.

So far as the loop 3 for heat-transfer liquid is concerned, the pump 13 is switched off, which means that there is no circulation of heat-transfer liquid in the first portion of the heat-transfer liquid loop between the first heat exchanger 5 and the first heat exchanger 12. By contrast, the circulation means 48 is active and causes the heat-transfer liquid to circulate in the second portion of the heat-transfer-liquid loop between the first heat exchanger 5 and the second heat exchanger 35, so as to off-load heat energy into the flow 19 of exterior air.

Figure 8:
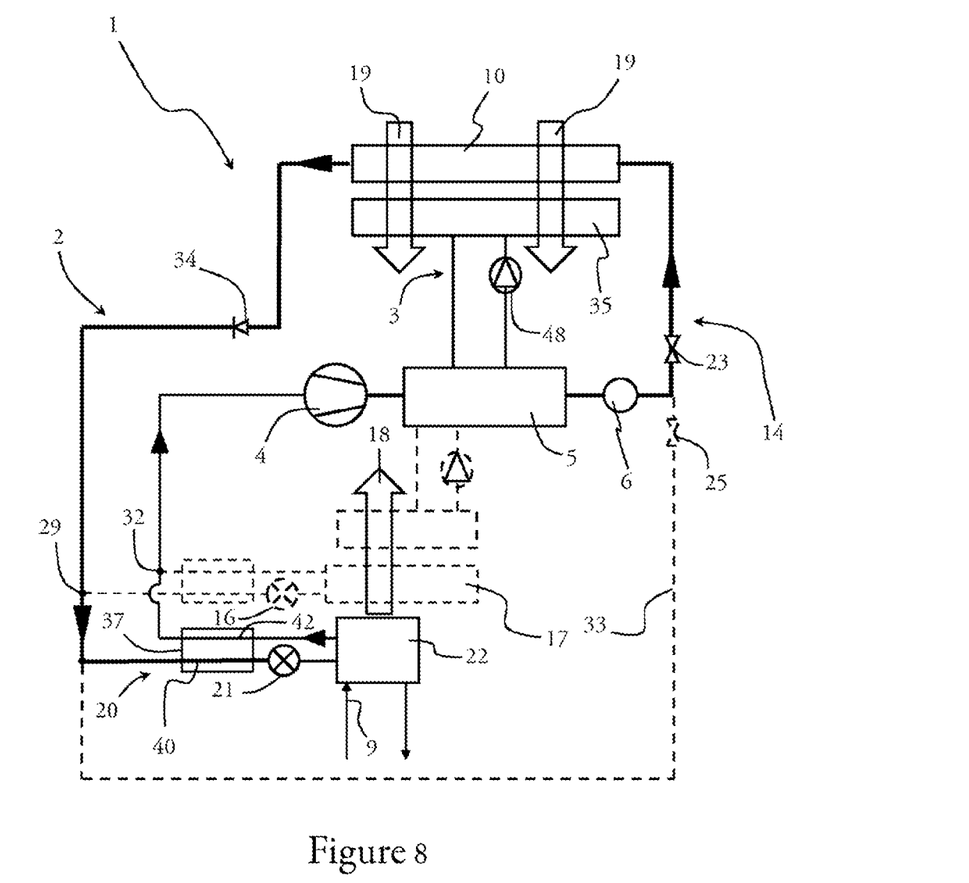

FIG. 8 illustrates a mode of operation corresponding to a cooling of a component of the electric powertrain of the vehicle, via the additional fluid 9. Such a component is, for example, an electric motor used for propelling the vehicle, an electrical-energy storage device, or else a power electronics module which notably controls the electric motor used for propulsion.

The behavior of the refrigerant in the first portion 14 is identical to that of FIG. 7, and reference may be made to the description of that figure for a description thereof. This mode of operation differs from that of FIG. 7 in that the first expansion device 16 is placed in a closed position, preventing any circulation of refrigerant in the second heat exchanger 17.

The leg 20 on the other hand is active, insofar as the third heat exchanger 22 is operating as an evaporator. The refrigerant in the liquid state passes through the first pass 40 of the second internal heat exchanger 37 and arrives at the second expansion device 21, in which it experiences expansion. The refrigerant then vaporizes as it passes through the third heat exchanger 22, the latter having passing through it the additional heat-transfer liquid 9 which exchanges heat with one or other of the components of the electric powertrain mentioned hereinabove. This is how the cooling of this component is brought about.

The refrigerant in the gaseous state then leaves the third heat exchanger 22 and passes through the second pass 42 of the second internal heat exchanger 37. There is a transfer of heat energy between the refrigerant in the liquid state which is present in the first pass 40 and the refrigerant in the gaseous state which is present in the second pass 42 of the second internal heat exchanger 37. The refrigerant which leaves the second pass 42 of the second internal heat exchanger 37 finally arrives at the inlet of the compression device 4 so that a new thermodynamic cycle can take place within the refrigerant circuit 2.

Figure 9:
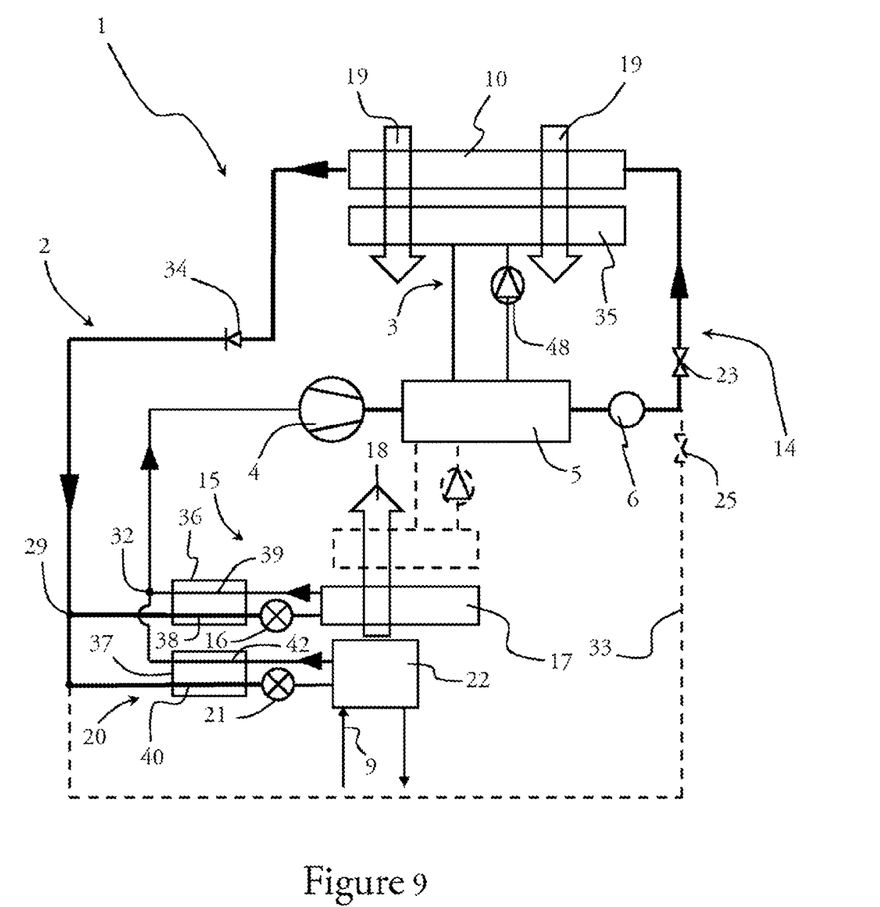

FIG. 9 illustrates a mode of operation corresponding to a combination of the mode of operation of FIG. 7 with the mode of operation of FIG. 8. This mode of operation of FIG. 9 simultaneously performs cooling of the vehicle cabin interior and cooling of a component of the electric powertrain of the vehicle. This situation may arise for example when the vehicle is in a rapid-charging phase, or is running at high speed, with high exterior temperature conditions.

The behavior of the refrigerant in the first portion 14 is identical to that of FIG. 7 or 8, and reference may be made to the description of those figures for a description thereof.

In the case of FIG. 9, the second portion 15 and the leg 20 are active, insofar as the second heat exchanger 17 and the third heat exchanger 22 are simultaneously operating as evaporators.

At the point of divergence 29, the refrigerant divides and circulates through each of the internal heat exchangers 36, 37. The first expansion device 16 and the second expansion device 21 employ an expansion of the refrigerant, the latter then vaporizing in the second heat exchanger 17 and in the third heat exchanger 22. The refrigerant leaving the second pass 39 of the first internal heat exchanger 36 and leaving the second pass 42 of the second internal heat exchanger 37 combine at the point of convergence 32 to then reach the inlet of the compression device 4, so that a new thermodynamic cycle can take place within the refrigerant circuit 2.

Figure 10:
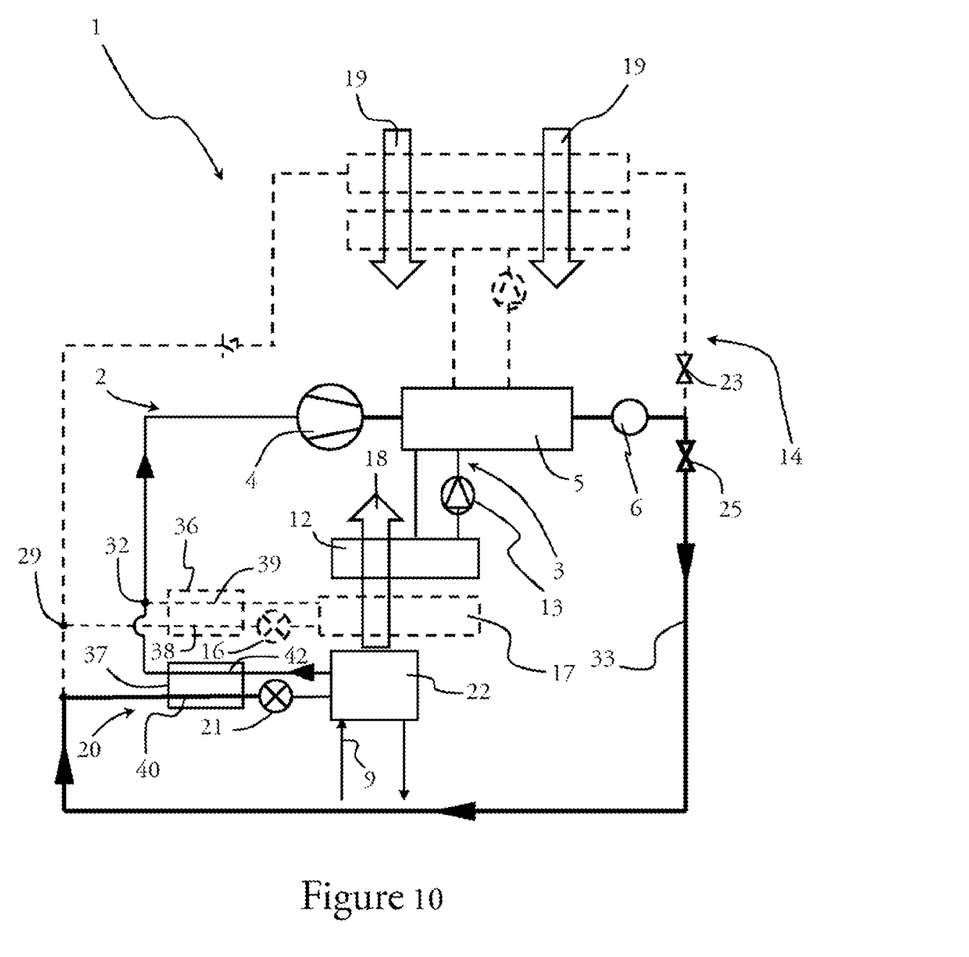

FIG. 10 illustrates a mode of operation referred to as a mode of heating the vehicle cabin interior by recovering heat energy from a component of the electric powertrain. This is used to great benefit to perform the thermodynamic cycle which takes place within the refrigerant circuit 2. This mode of operation thus allows the flow 8 of interior air to be heated using energy which would otherwise be lost by dissipating into the flow of exterior air.

In order to do this, the first heat exchanger 5 off-loads the heat energy generated by the compression device 4 into the heat-transfer liquid. The pump 13 is active and the hot heat-transfer liquid can then reach the first heat exchanger 12 and thus heat the flow 18 of interior air sent into the vehicle cabin interior. The refrigerant is therefore condensed and its liquid phase is stored in the accumulation device 6, whether the latter be downstream or incorporated into the first heat exchanger 5.

The first valve 23 is in the closed position, thus blocking any circulation of refrigerant toward the fourth heat exchanger 10. The second valve 25 is in the open position, allowing refrigerant to circulate through the piping 33. The second expansion device 21 is open, and causes the refrigerant to expand. The leg 20 is thus active, insofar as the third heat exchanger 22 is operating as an evaporator. The refrigerant in the liquid state passes through the first pass 40 of the second internal heat exchanger 37 and arrives at the second expansion device 21. The refrigerant then vaporizes as it passes through the third heat exchanger 22, the latter having passing through it the additional heat-transfer liquid 9 which exchanges heat with one or other of the components of the electric powertrain, such as those listed hereinabove. Thus, heat energy is recovered from the electric powertrain and used to operate the evaporation phase of the thermodynamic cycle.

The first expansion device 16 is placed in a closed position, preventing any circulation of refrigerant in the second portion 15 of the refrigerant circuit 2.

The thermal management system 1 according to the first embodiment, according to the second embodiment, or according to the third embodiment, may comprise means for acquiring information relating to the refrigerant circuit 2, to the heat-transfer-liquid loop 3, to one of the components of the electric powertrain, notably the electrical-energy storage device, or to the vehicle cabin interior, and means for acting on the components of this thermal management system in such a way as to achieve fixed setpoints, notably with regard to the temperatures of the flow 18 of interior air, to the refrigerant, or to the rotational speeds of the compression device 4. This control of the thermal management system 1 may be performed by a control device which may take the form of an electronic unit or box. This control device is advantageously capable of operating the compression device 4, the valves, the expansion devices, the pump and/or the means for circulating the heat-transfer liquid. The control device thus acts on the rotational speed of this compression device, notably when this is a fixed-displacement compressor with inbuilt electric motor.

It will be appreciated from the foregoing that the present invention thus makes it possible in a simple way and for optimized cost to provide thermal management, through heating or cooling, of a component of the electric powertrain, such as a battery or a battery pack, and/or of the interior of the vehicle cabin. The objectives set for the invention are achieved, by making available a thermal management system which, with reduced means, performs a function of cooling the vehicle cabin interior, a function of recovering energy from a component of the electric powertrain, and a function of providing thermal management of one of the components of this electric powertrain of the vehicle.

The invention is by no means limited to the means and configurations described and illustrated herein, and it also extends to any equivalent means or configurations and to any technically operational combination of such means. In particular, the architecture of the refrigerant circuit or of the heat-transfer-liquid loop can be modified without detriment to the invention provided that it fulfils the functionalities described in the present document.

The invention claimed is:

1. A vehicle thermal management system comprising:
   a refrigerant circuit;
   a loop for heat-transfer liquid; and
   a first heat exchanger which thermally couples the loop for heat-transfer liquid with the refrigerant circuit,
   the loop for heat-transfer liquid comprising:
      at least one heat exchanger configured to dissipate heat energy into a flow of air,
   the refrigerant circuit comprising:
      at least a compression device,
      the first heat exchanger,
      a refrigerant accumulation device,
      a first expansion device,
      a second heat exchanger configured to have passing through it a flow of interior air sent into the interior of the vehicle cabin,
      a leg arranged in parallel with the first expansion device and with the second heat exchanger, said leg comprising a second expansion device and a third heat exchanger able to be thermally coupled to a component of an electric powertrain of the vehicle;
      a point of divergence, at which the leg begins;
      a point of convergence at which said leg ends; and
      a fourth heat exchanger configured to have passing through it a flow of air external to the interior of the vehicle cabin and positioned between an outlet of the accumulation device and the point of divergence.

2. The system as claimed in claim 1, wherein the refrigerant circuit further comprises:
   an internal heat exchanger which comprises a first pass and a second pass which are configured to have the refrigerant pass through them, the second pass of the internal heat exchanger being positioned between the point of convergence and an inlet of the compression device.

3. The system as claimed in claim 1, wherein the first expansion device and the second expansion device are configured to cut off any circulation of refrigerant toward the second heat exchanger or toward the third heat exchanger, respectively.

4. The system as claimed in claim 1, wherein the refrigerant circuit further comprises at least one check valve positioned between an outlet of the fourth heat exchanger and the point of divergence.

5. The system as claimed in claim 1, wherein the at least one heat exchanger of the loop for heat-transfer liquid is a radiator configured to have passing through it the flow of air external to the interior of the vehicle cabin.

6. The system as claimed in claim 1, wherein the at least one heat exchanger of the loop for heat-transfer liquid is a unit heater configured to have passing through it the flow of interior air sent into the interior of the vehicle cabin.

7. The system as claimed in claim 1, wherein the accumulation device is a bottle of desiccant.

8. The system as claimed in claim 1, wherein the refrigerant circuit further comprises: a first internal heat exchanger of which at least one pass is positioned between an outlet of the second heat exchanger and the point of convergence.

9. The system as claimed in claim 8, wherein the refrigerant circuit further comprises a second internal heat exchanger of which at least one pass is positioned between an outlet of the third heat exchanger and the point of convergence.

10. A thermal management system for a motor vehicle, comprising:
  a loop for heat-transfer liquid; and
  a first heat exchanger which thermally couples the loop for heat-transfer liquid with a refrigerant circuit,
  the loop for heat-transfer liquid comprising:
    at least one heat exchanger configured to dissipate heat energy into a flow of air,
  the refrigerant circuit comprising:
    a compression device,
    the first heat exchanger,
    a refrigerant accumulation device,
    a first expansion device,
    a second heat exchanger for passing through a flow of interior air sent into the interior of the vehicle cabin,
  a leg arranged in parallel with the first expansion device and with the second heat exchanger, said leg comprising a second expansion device and a third heat exchanger thermally coupled to at least one component of an electric powertrain of the motor vehicle,
  a point of divergence, at which the leg begins;
  a point of convergence at which said leg ends; and
    a fourth heat exchanger configured to have passing through it a flow of air external to the interior of the vehicle cabin and positioned between an outlet of the refrigerant accumulation device and the point of divergence,
  wherein the thermal management system performs: a function of cooling a motor vehicle cabin interior, a function of recovering energy from the at least one component of the electric powertrain, and a function of providing thermal management of the at least one component of the electric powertrain of the motor vehicle.

* * * * *